(12) United States Patent
D'Souza

(10) Patent No.: US 9,946,407 B2
(45) Date of Patent: Apr. 17, 2018

(54) FREQUENCY MULTIPLEXED OPTICAL TOUCHSCREEN

(71) Applicant: ELO TOUCH SOLUTIONS, INC., Milpitas, CA (US)

(72) Inventor: Henry D'Souza, San Diego, CA (US)

(73) Assignee: ELO TOUCH SOLUTIONS, INC., Milpitas, CA (US)

( * ) Notice: Subject to any disclaimer, the term of this patent is extended or adjusted under 35 U.S.C. 154(b) by 246 days.

(21) Appl. No.: 14/994,875

(22) Filed: Jan. 13, 2016

(65) Prior Publication Data
US 2017/0199626 A1    Jul. 13, 2017

(51) Int. Cl.
G06F 3/042    (2006.01)

(52) U.S. Cl.
CPC ............ G06F 3/0421 (2013.01); G06F 3/042 (2013.01)

(58) Field of Classification Search
CPC .............................. G06F 3/042; G06F 3/0421
See application file for complete search history.

(56) References Cited

U.S. PATENT DOCUMENTS

| | | | |
|---|---|---|---|
| 8,461,512 B2 | 6/2013 | Drumm | |
| 8,531,435 B2 | 9/2013 | Drumm | |
| 8,669,951 B2 | 3/2014 | Chuang et al. | |
| 8,842,366 B2 | 9/2014 | Arnett et al. | |
| 9,092,094 B1* | 7/2015 | Baldwin | G06F 3/0425 |
| 9,377,900 B1* | 6/2016 | Baldwin | G06F 21/83 |
| 2006/0227120 A1* | 10/2006 | Eikman | G06F 3/0425 345/175 |
| 2008/0047762 A1 | 2/2008 | Lieberman et al. | |
| 2011/0074544 A1 | 3/2011 | D'Souza | |
| 2011/0074735 A1* | 3/2011 | Wassvik | G06F 3/0421 345/175 |
| 2011/0216042 A1* | 9/2011 | Wassvik | G06F 3/0412 345/175 |
| 2011/0267382 A1* | 11/2011 | Fergason | G02F 1/1336 345/690 |

* cited by examiner

*Primary Examiner* — Dmitriy Bolotin
(74) *Attorney, Agent, or Firm* — Sterne, Kessler, Goldstein & Fox, PLLC

(57) ABSTRACT

An apparatus, methods, systems, and computer program products are provided that can detect touch events on touch panels in a more effective and less costly manner. According to an embodiment, a touch system includes a touch panel and a plurality of radiation sources located at a first edge of the touch panel. The intensity of light emitted from each of the plurality of radiation sources is modulated with a respective modulation frequency. The touch system further includes an optical receiver that is located at a second edge of the touch panel and is configured to receive the light emitted from each of the plurality of radiation sources.

20 Claims, 10 Drawing Sheets

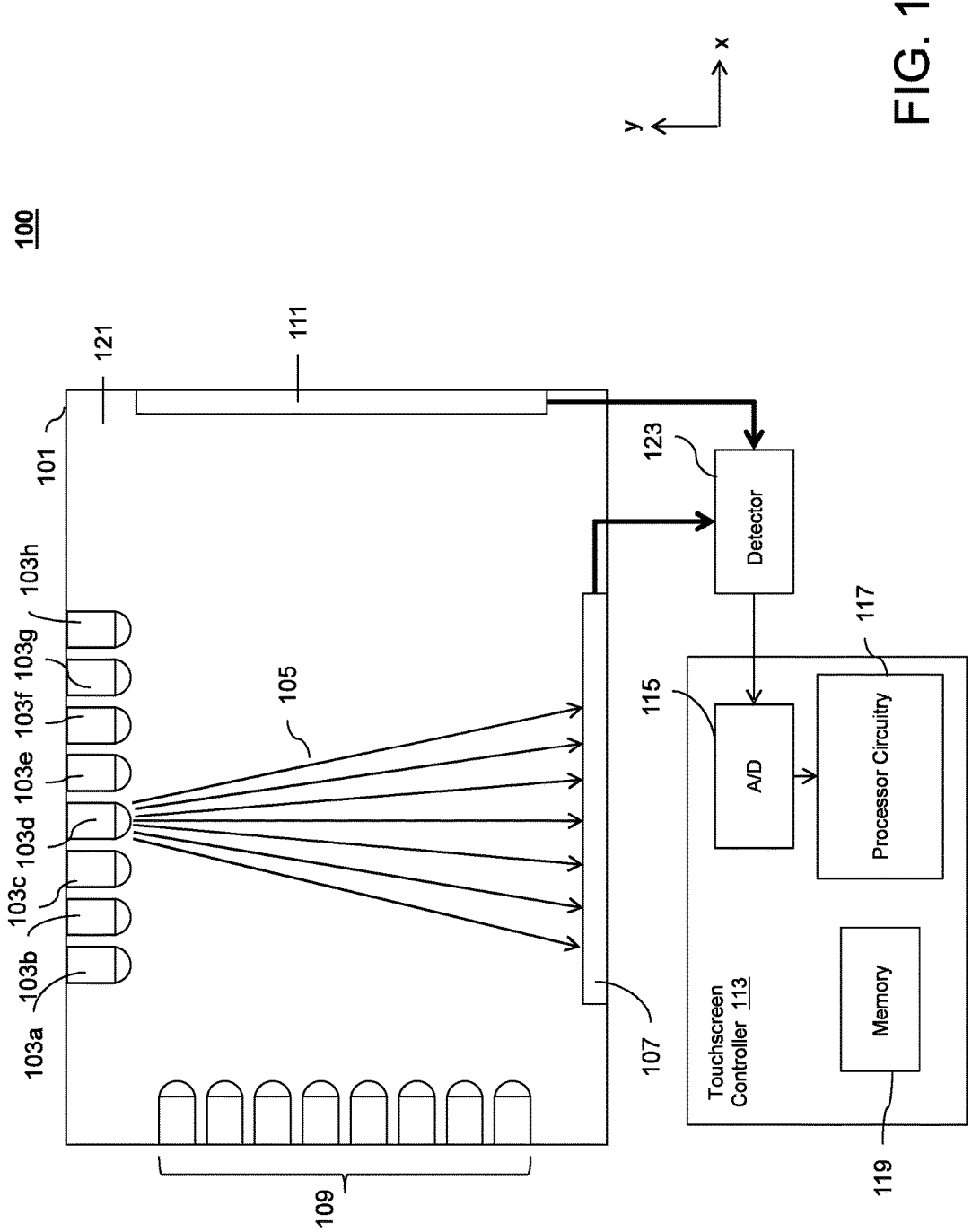

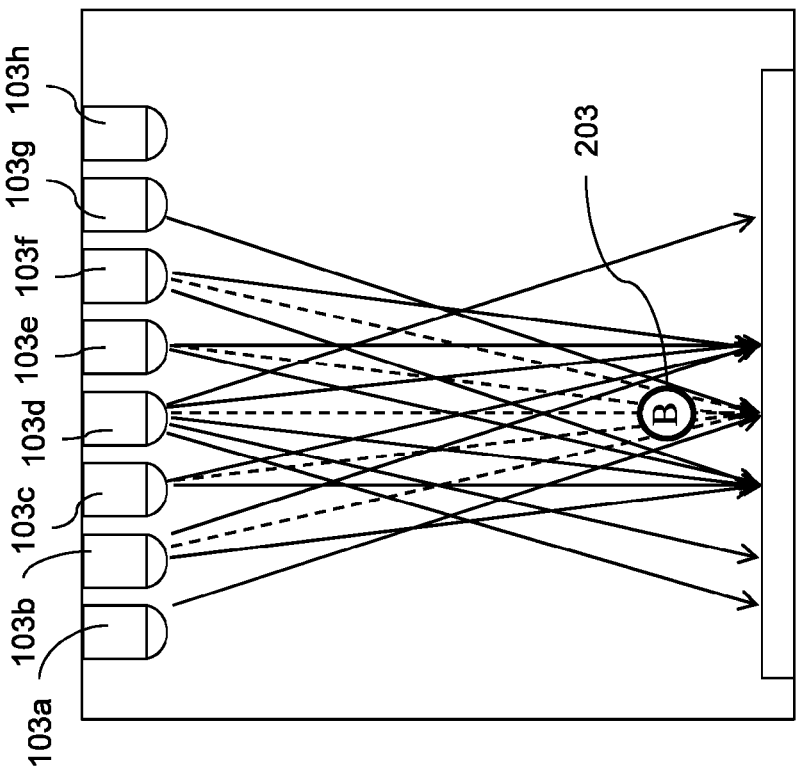
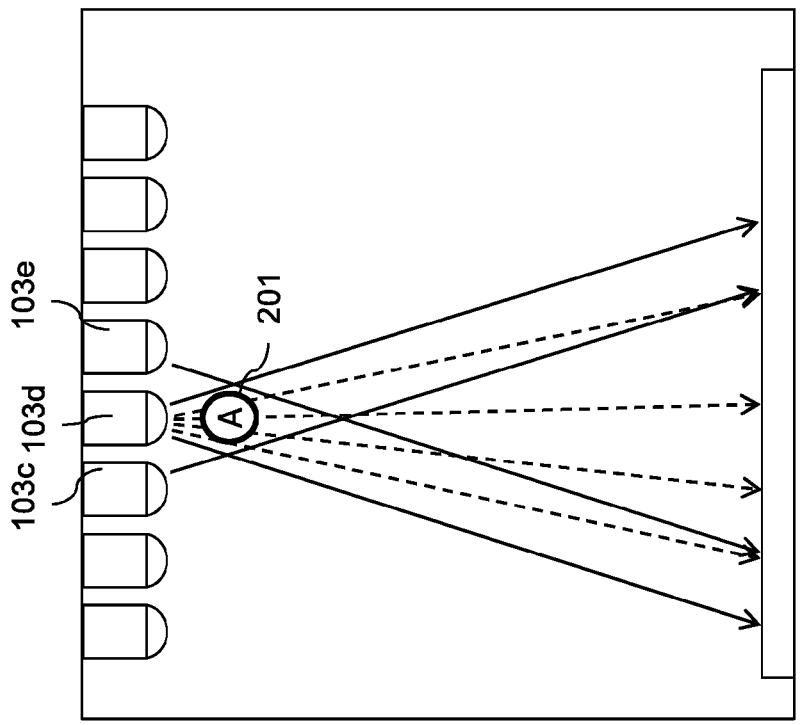
FIG. 2B
FIG. 2A

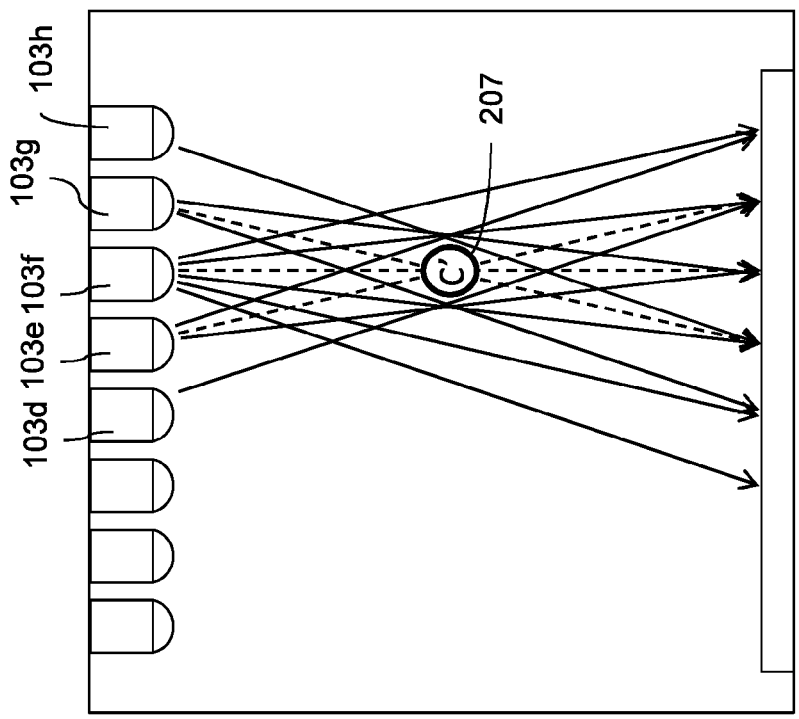
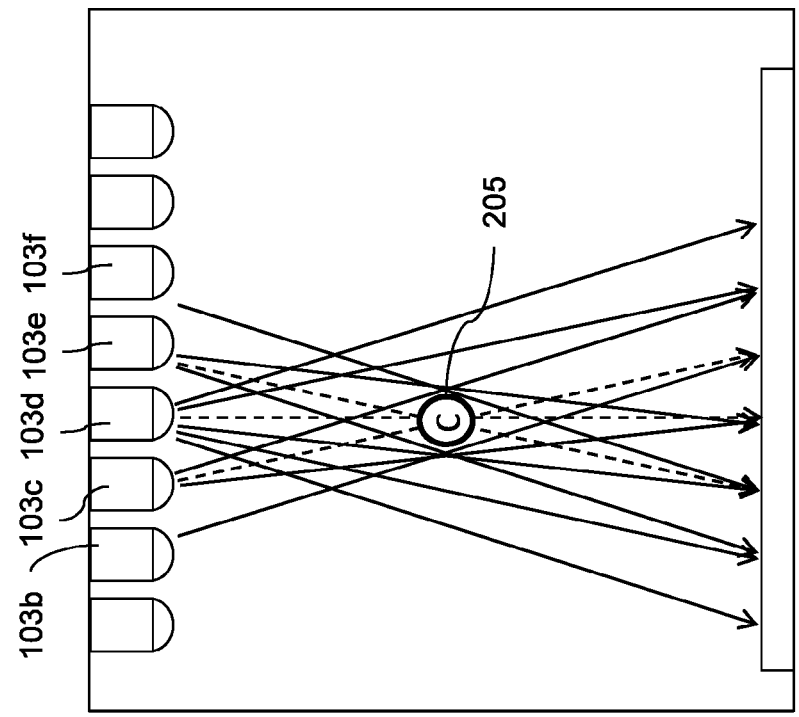
FIG. 2D
FIG. 2C

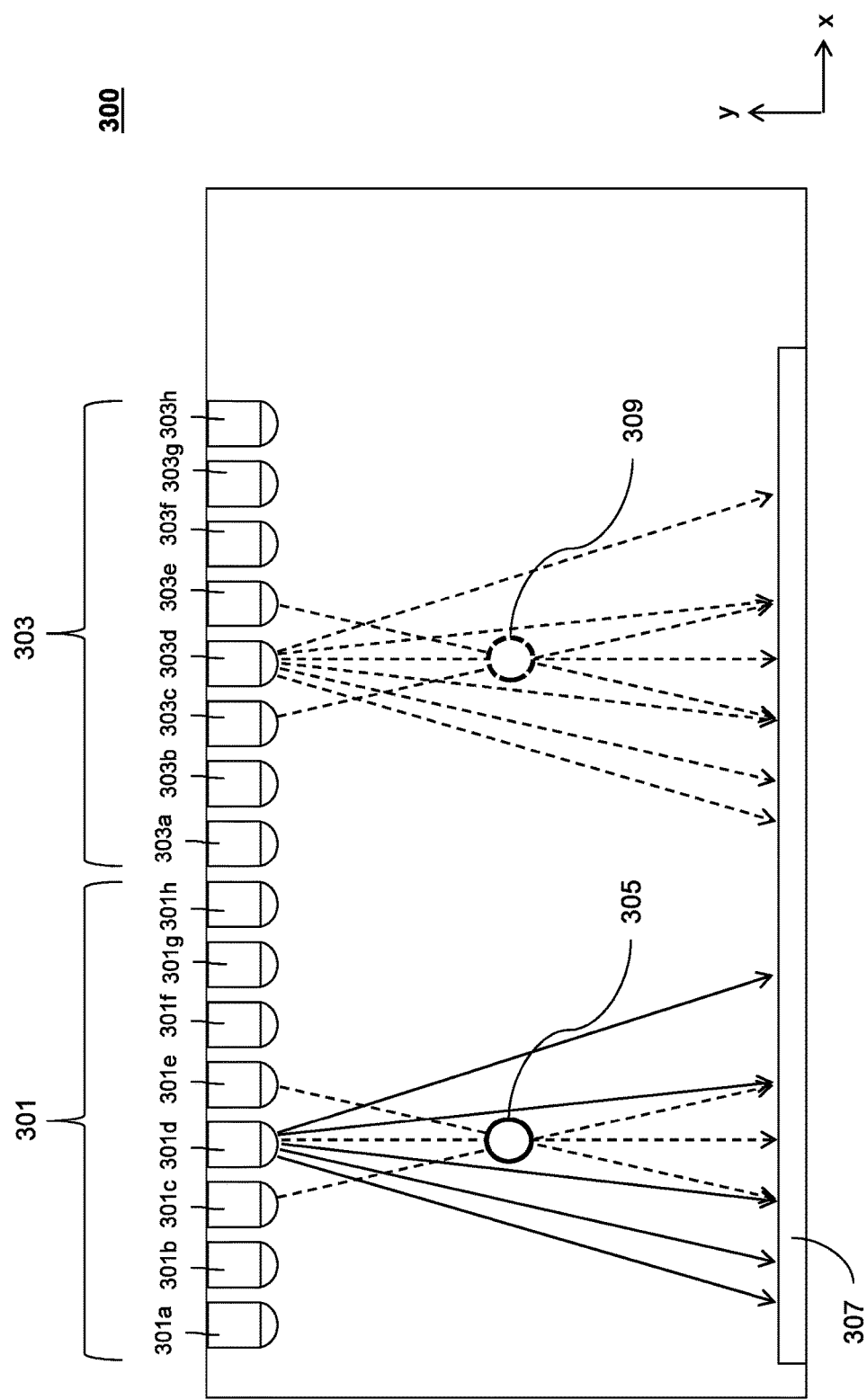

| 323 ↙ | Group 1 | | 325 ↙ | Group 2 | | 327 ↙ | Group 3 | | 329 ↙ | Group 4 | |
|---|---|---|---|---|---|---|---|---|---|---|---|
| | LED# | Frequency # | | LED# | Frequency # | | LED# | Frequency # | | LED# | Frequency # |
| | 1 | 1 | | 33 | 1 | | 65 | 2 | | 97 | 1 |
| | 2 | 2 | | 34 | 3 | | 66 | 5 | | 98 | 5 |
| | 3 | 3 | | 35 | 5 | | 67 | 8 | | 99 | 9 |
| | 4 | 4 | | 36 | 7 | | 68 | 11 | | 100 | 13 |
| | 5 | 5 | | 37 | 9 | | 69 | 14 | | 101 | 17 |
| | 6 | 6 | | 38 | 11 | | 70 | 17 | | 102 | 21 |
| | 7 | 7 | | 39 | 13 | | 71 | 20 | | 103 | 25 |
| | 8 | 8 | | 40 | 15 | | 72 | 23 | | 104 | 29 |
| | 9 | 9 | | 41 | 17 | | 73 | 26 | | 105 | 2 |
| | 10 | 10 | | 42 | 19 | | 74 | 29 | | 106 | 6 |
| | 11 | 11 | | 43 | 21 | | 75 | 32 | | 107 | 10 |
| | 12 | 12 | | 44 | 23 | | 76 | 3 | | 108 | 14 |
| | 13 | 13 | | 45 | 25 | | 77 | 6 | | 109 | 18 |
| | 14 | 14 | | 46 | 27 | | 78 | 9 | | 110 | 22 |
| | 15 | 15 | | 47 | 29 | | 79 | 12 | | 111 | 26 |
| | 16 | 16 | | 48 | 31 | | 80 | 15 | | 112 | 30 |
| | 17 | 17 | | 49 | 2 | | 81 | 18 | | 113 | 3 |
| | 18 | 18 | | 50 | 4 | | 82 | 21 | | 114 | 7 |
| | 19 | 19 | | 51 | 6 | | 83 | 24 | | 115 | 11 |
| | 20 | 20 | | 52 | 8 | | 84 | 27 | | 116 | 15 |
| | 21 | 21 | | 53 | 10 | | 85 | 30 | | 117 | 19 |
| | 22 | 22 | | 54 | 12 | | 86 | 1 | | 118 | 23 |
| | 23 | 23 | | 55 | 14 | | 87 | 4 | | 119 | 27 |
| | 24 | 24 | | 56 | 16 | | 88 | 7 | | 120 | 31 |
| | 25 | 25 | | 57 | 18 | | 89 | 10 | | 121 | 4 |
| | 26 | 26 | | 58 | 20 | | 90 | 13 | | 122 | 8 |
| | 27 | 27 | | 59 | 22 | | 91 | 16 | | 123 | 12 |
| | 28 | 28 | | 60 | 24 | | 92 | 19 | | 124 | 16 |
| | 29 | 29 | | 61 | 26 | | 93 | 22 | | 125 | 20 |
| | 30 | 30 | | 62 | 28 | | 94 | 25 | | 126 | 24 |
| | 31 | 31 | | 63 | 30 | | 95 | 28 | | 127 | 28 |
| | 32 | 32 | | 64 | 32 | | 96 | 31 | | 128 | 32 |

FIG. 3B

FREQUENCY MULTIPLEXED OPTICAL TOUCHSCREEN

BACKGROUND

Field

The present disclosure relates generally to touch sensitive systems and more specifically to identifying location(s) of touch events on a touch sensitive system using frequency modulated radiation sources (such as light emitting diodes (LEDs)).

Background Art

Touch panels are provided to detect two-dimensional coordinate information. A touch panel can be an opaque track pad. Another example of a touch panel can include a transparent touchscreen that can be placed in front of a display such as a liquid crystal display. Touch panels can be based on a variety of sensing technologies, for example, resistive, capacitive, surface acoustic wave, infrared (IR) grid, IR acrylic projection, optical imaging, acoustic pulse recognition, etc.

As one example, infrared (IR) touch panels can include an array of X-Y light emitting diodes (LEDs) and detectors. The detectors can detect the two-dimensional coordinate of a touch on the IR touch panel when the touch disrupts the beam of radiation from the LEDs. In this example, the LEDs and the detectors are located on the edges of the IR touch panel. In some conventional IR touch panels, only one of the LEDs is on (emitting light) at a time and therefore, for large size touch panels, where there is a large area to scan, it is technically challenging to achieve a suitably fast response time and minimize the cost.

SUMMARY

Apparatus, system, method, and computer program product embodiments are provided that more effectively and less costly can detect touch events on touch panels. According to an embodiment, a touch system includes a touch panel, a first plurality of radiation sources that are located at a first edge of the touch panel, and a second plurality of radiation sources that are located at the first edge of the touch panel. The intensity of light emitted from each of the first and second plurality of radiation sources is modulated with a modulation frequency from a set of frequencies utilized repetitively in varying order between the first and the second plurality of radiation sources. The touch system further includes an optical receiver that is located at a second edge of the touch panel and is configured to receive the light emitted from each of the first and second plurality of radiation sources.

According to another embodiment of the disclosure, a touch system includes a touch panel, a first plurality of light emitting diodes (LEDs) that are located at a first edge of the touch panel, and a second plurality of LEDs that are located at the first edge of the touch panel. The intensity of light emitted from each of the first and second plurality of LEDs is modulated with a modulation frequency from a set of frequencies utilized repetitively in varying order between the first and the second plurality of LEDs. Modulation frequencies mentioned throughout can include sinusoidal frequencies. The touch system further includes a first optical receiver that is located at an opposite edge of the touch panel and is configured to receive the light emitted from each of the first and second plurality of LEDs. The touch system also includes a third plurality of LEDs that are located at a third edge of the touch panel. The intensity of light emitted from each of the third plurality of LEDs is modulated with a respective modulation frequency and the third edge of the touch panel is orthogonal to the first edge of the touch panel. The touch system also includes a second optical receiver that is located at a fourth edge of the touch panel and is configured to receive the light emitted from each of the third plurality of LEDs. The touch system also includes processor circuitry that is configured to detect a touch event on the touch panel based on the light received from the first, second, and third plurality of LEDs.

According to another embodiment of the disclosure, a method is provided that includes receiving radiation beams from a first plurality of radiation sources and a second plurality of radiation sources located at a first edge of a touch panel. The intensity of the radiation beam emitted from each of the first and second plurality of radiation sources is modulated with a modulation frequency from a set of frequencies utilized repetitively in varying order between the first and the second plurality of radiation sources. The method further includes digitization of the received signal, comprising superimposing received signals of all radiated frequencies, and performing a frequency transform on the digital signal and determining an amplitude of the frequency transformed signal for each of the respective modulation frequencies. The method also includes determining coordinates of a touch event on the touch panel based on the determined amplitudes.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 1 illustrates a frequency multiplexed touch panel system, according to example embodiments of the disclosure.

FIGS. 2A-2D are exemplary illustrations of different locations of a touch event on a touch panel and their effect on calculated attenuation factors, according to example embodiments of this disclosure.

FIG. 3A illustrates a frequency multiplexed touch panel system, according to another example embodiment of the disclosure.

FIG. 3B illustrates an example for scrambling frequencies for blocks of LEDs, according to an embodiment of the disclosure.

Figure 2E:
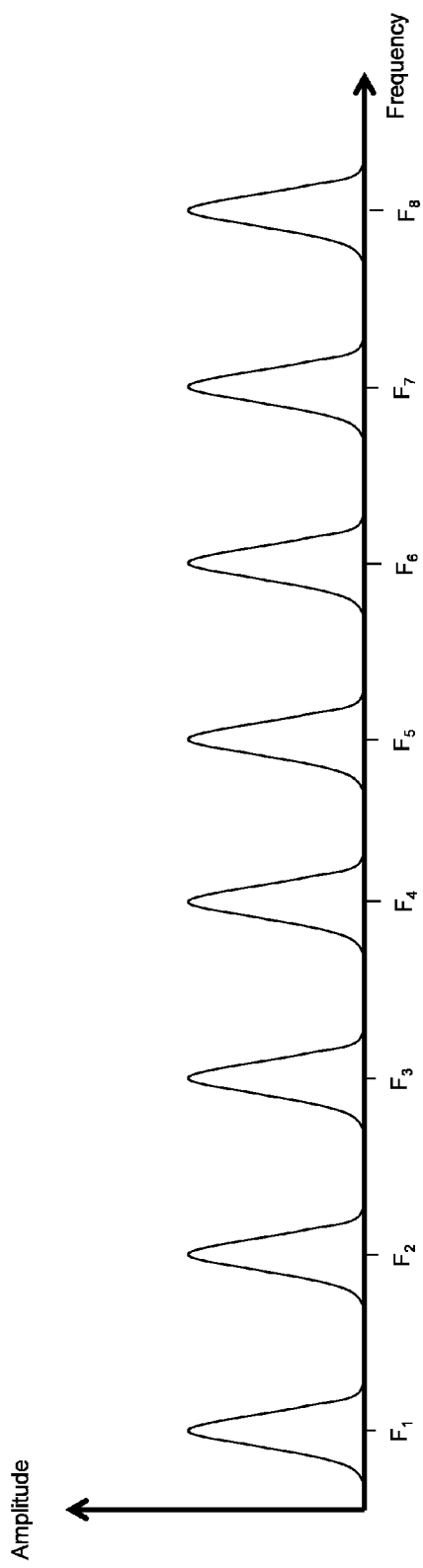
FIGS. 2E and 2F are exemplary frequency transformed signals, according to example embodiments of this disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

For the purposes of this discussion, the term "processor circuitry" shall be understood to include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal or external memory to retrieve instructions stored in the memory, which when executed by the processor, perform the corresponding function(s) associated with the processor.

FIG. 1 illustrates a frequency multiplexed touch panel system 100, according to embodiments of the disclosure. The frequency multiplexed touch panel system 100 can be, for example, an infrared (IR) touch panel where the radiation sources are substantially simultaneously projecting radiation beam and the intensity of the radiation beam for each radiation source changes at a different frequency from other radiation sources. One or more detectors at the frequency multiplexed touch panel system 100 are configured to detect two-dimensional location(s) of one or more touches on the touch panel 101 based on attenuation level of detected light at each frequency.

Frequency multiplexed touch panel system 100 includes touch panel 101, radiation sources, such as but not limited to LEDs, 103a-103h (collectively 103), LEDs 109, optical receivers (such as but not limited to light pipes, waveguides) 107 and 111, detector 123, and touch screen controller 113. According to an embodiment, touch panel 101 can include a substrate 121, such as a sheet of glass, aluminum or other material. Touch panel 101 can be part of a display or can be mounted in front of (and/or on) a display that may support a graphical user interface (GUI) displaying button, icons, and/or other graphical representations. For example, touch panel 101, when used as a touchscreen, can be formed of a non-opaque material such as glass mounted in front of the display. Additionally or alternatively, touch panel 101 can be formed of an opaque material and may be located physically separate from a display. It is noted that although touch panel 101 is discussed in this disclosure, other touch panels, touchscreen, and touch systems can be used.

Frequency multiplexed touch panel system 100 also includes radiation sources, such as but not limited to LEDs 103 and 109. According to this example, LEDs 103 are located along the X axis on top of touch panel 101 and LEDs 109 are located along the Y axis. However, LEDs 103 and 109 can be located along different locations on touch panel 101. Further, although eight LEDs are shown for each of LEDs 103 and 109, it is noted that any number of LEDs can be used. For example, the LEDs 103 and 109 can cover X and Y axes of touch panel 101 such that the surface of touch panel 101 would be covered by light emitted by LEDS 103 and 109.

According to an embodiment, LEDs 103 and/or 109 are located over touch panel 101 such that the fan light emitted from these LEDs define a light curtain over the surface of touch panel 101. For example, LEDs 103 and/or 109 are located on a printed circuit board over the surface of touch panel 101 such that their fan light shine across touch panel 101 just above touch panel's 101 surface. Therefore, a touch on touch panel 101 will block or partially block one or more light fans emitted from one or more LEDs. The light emitted from LEDs 103 and 109 can be near infrared light (e.g., having wavelength of approximately 780 nm.) However, it is noted that other wavelengths can also be used.

Additionally or alternatively, LEDs 103 and/or 109 can be located under the surface of touch panel 101 and a frustrated total internal reflection technique (FTIR) can be used. According to this example, LEDs 103 and/or 109 that are located under surface of touch panel 101 can shine line through, for example, a prism to touch panel 101. In one example, the prism can be bounded to touch panel 101. Additionally or alternatively, the LEDs 103 and/or 109 can be located outside touch panel 101 but between the top and bottom surfaces of touch panel 101. The light can go from the prism inside the touch panel 101 at an incident angle that is greater than the total internal reflection angle of touch panel 101 (which can be made of glass, in one example.) In this case the light emitted from LEDs 103 and/or 109 does not come out of touch panel 101, but it will be reflected inside touch panel 101 with an angle equal to the incident angle. According to this example, the light will reflect inside touch panel 101 from the LEDs 103 and/or 109 to light pipes 107 and/or 111, respectively, without leaving touch panel 101. When a touch is made on touch panel 101, the total internal reflection angle of touch panel 101 will change at the location of the touch event because of the reflection index of the material that made the touch. For example, when a touch is made by a finger of a user (finger is made mostly from water that has a reflection index similar to glass) total internal reflection angle of touch panel 101 changes at the location of the touch. For example, the total internal reflection angle increases at the location of the touch and therefore, the light will no longer reflect at the location of touch and instead, it will be absorbed in the material that was used to make the touch (for example, the user's finger.) Therefore, the light beam does not continue to the light pipe and detector 123, and touchscreen controller 113 can determine that the light beam has been blocked or partially blocked and can use the analysis discussed below to determine the location of the touch.

As illustrated in FIG. 1, LED 103d is configured to emit a fan of radiation beams 105 (for example, infrared light). According to one example, the fan of radiation beams 105 has a twenty degree angle at its top (where it is being emitted from LED 103d). However, it is noted that this disclosure is not limited to this angle and any other angles can be used. Radiation beams 105 are captured by optical receiver 107 (such as a light pipe, a waveguide, etc.) and are directed to detector 123 and touchscreen controller 113.

According to this example, the intensity of light emitted from diode 103d is changed in time. In other words, the intensity of light emitted from diode 103d changes from a minimum intensity (for example, zero intensity/brightness) to a maximum intensity (for example, full brightness) with a frequency of $F_4$. Similarly, the intensity of light emitted from diodes 103a, 103b, 103c, 103e, 103f, 103g, and 103h are changed with frequencies of $F_1$, $F_2$, $F_3$, $F_5$, $F_6$, $F_7$, and $F_8$, respectively. According to one example, the frequency range used can be between 200 Hz and 20 kHz. This frequency range is an audio frequency range and accordingly, an audio Fast Fourier Transform (FFT) (as one example) can be used in touchscreen controller 113 to determine amplitude of the frequency transformed signal for each frequency. The determined amplitude for each modulation frequency is associated with the amount of reduction/attenuation in received radiation beams from the radiation source associated with that modulation frequency because of a possible touch event blocking those radiation beams. It is noted that the frequency range is not limited to the audio range and other frequency ranges can also be used. For example, higher frequency ranges such as video frequency range can also be used that would need higher sampling rate A/D converters and faster FFTs (for example, FFTs for video applications.) In one example, LEDs 103 (and/or 109) are coupled to (not shown) a controller (such as, but not limited to, processor circuitry 117) such that the controller can control the frequencies at which the intensities of LEDs' lights are changed.

Light pipe 107 receives the light from each of the LEDs 103 and guides the received light to detector 123. According to this example, detector 123 is configured to measure a spectrum (e.g., intensity of the received light) and generate an analog signal based on the detected light from LEDs 103. Additionally or alternatively, detector 123 can be a photodetector such as a charge-coupled device (CCD), optical detectors, photo transistors, image sensors (such as Complementary metal-oxide-semiconductor (CMOS) image sensors), etc.

Touchscreen controller 113 is configured to receive the analog signal from detector 123 and is configured to determine a location of a touch on touch panel 101 based on changes to the intensity of light at each frequency. According to one example, the analog data from detector 123 is converted to digital data using analog-to-digital (A/D) converter 115 and processor circuitry 117 is configured to perform a frequency transform, such as Fast Fourier Transform (FFT) on the digital data to generate a frequency transform data set of frequency components associated with the detected light. Based on the generated frequency transform data, processor circuitry 117 can be configured to determine the intensity of received light for each of the frequencies $F_1$-$F_8$. Based on the determined intensity, processor circuitry 117 can determine an attenuation factor for each of the frequencies. The attenuation factor for each frequency demonstrates how the intensity of the received light for that frequency compares to the maximum intensity of light for that frequency and can be used to determine whether light from an LED associated with that frequency was blocked by a touch event. In other words, the attenuation factor determines what percentage of the radiation beams from an LED has been blocked by a touch event. For a particular LED, if the touch is closer to the LED, more radiation beams from that LED are blocked by the touch, and therefore, there is a higher attenuation factor. However, if the touch is further away from the LED, less radiation beams from that LED are blocked by the touch, and therefore, there is a smaller value of the attenuation factor. Processor circuitry 117 can further use the attenuation factor for each frequency to determine the location of the touch event.

According to one example, processor circuitry 117 can include one or more audio digital signal processing (DSP) chips and/or video DSP chips to perform the frequency transform, such as FFT. In one example, the use of audio DSP and/or video DSP chip in touchscreen controller 113 can depend on the frequencies that are used to modulate the intensity of the light emitted by the LEDs.

According to one example, the maximum value of the intensity (that is used to determine the attenuation factor) can be stored in memory 119 and processor circuitry 117 can access memory 117 to retrieve the maximum value of the intensity. Processor circuitry 117 can construct a profile associated with the received light based on the attenuation factor for each frequency. In this example, processor circuitry 117 can use the constructed profile and compare it with stored profiles (stored in, for example, memory 119) to determine the location of the touch event on touch panel 102.

When the location of the touch event on touch panel 102 is determined, this location information can be used for further applications. According to one example, processor circuitry 117 and/or other processor circuitries (not shown) can run an application on a display (not shown) to which the touch event is related. Processor circuitry 117 and/or other processor circuitries can determine whether the location information indicates, for example, a selection of a button or an icon on the display. If a button or an icon is selected (for example), processor circuitry 117 and/or other processor circuitries (not shown) may take further action based on the functionality associated with the particular button or icon.

According to an exemplary embodiment, light pipe 107 (and/or 111) can include a glass cylinder (or a cylinder with square cross section) where light beam 105 enters the glass cylinder and can be reflected using reflective elements in the glass cylinder such that the light that enters the cylinder gets reflected down the cylinder toward detector 123.

Figure 5:
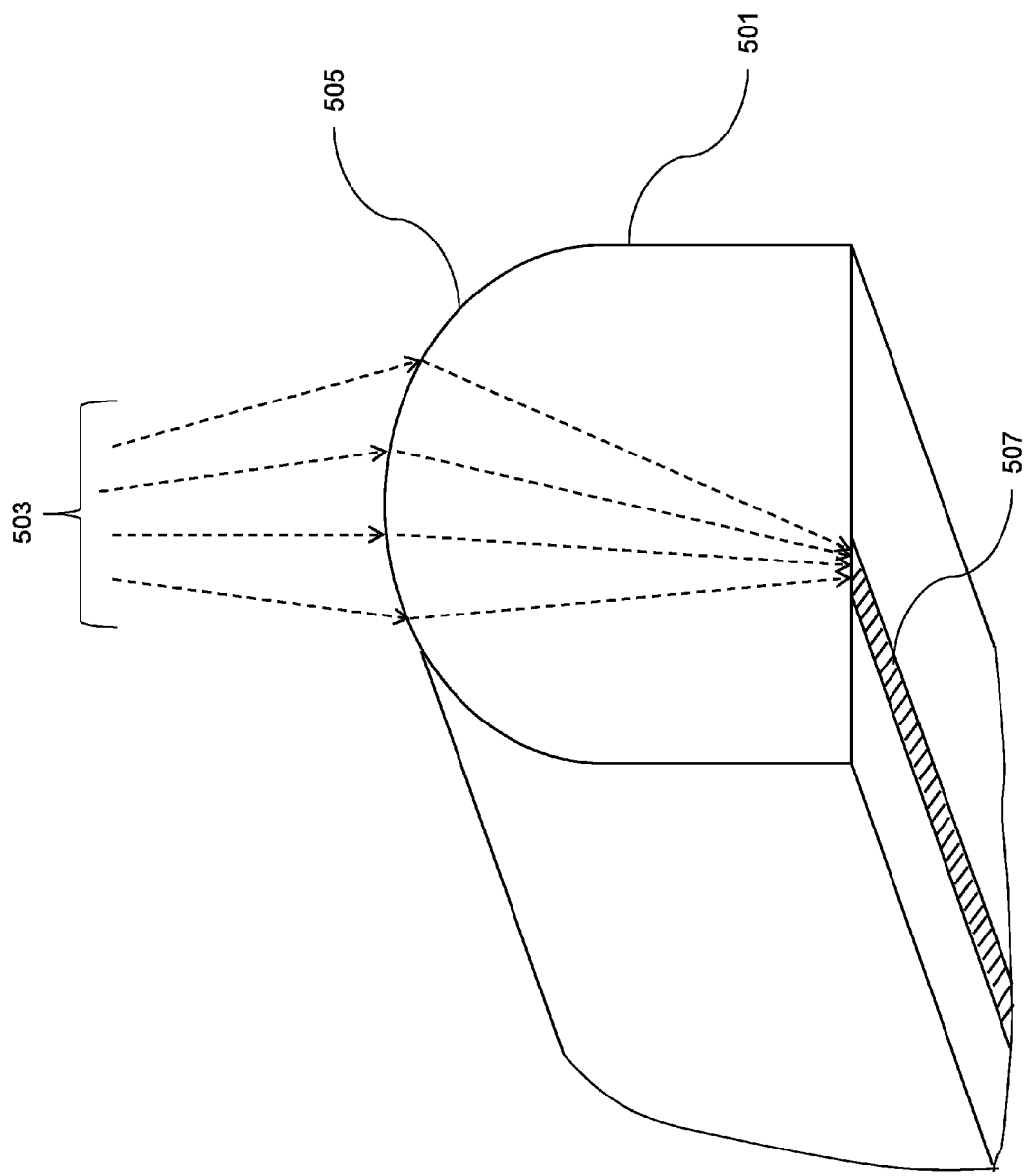
FIG. 5 illustrates a cross-section of a waveguide that can be used in the example embodiments of the disclosure.

An example of an optical receiver 107 (and/or 111) is shown in FIG. 5. FIG. 5 illustrates a cross-section of waveguide 501 that can be used as optical receiver 107 and/or 111. Light beams 503 (that are generated by LEDs 103 and/or 109) are received by waveguide 501 and are focused by waveguide surface 505 on an optically scattering strip 507. Optically scattering strip 507 can redirect at least some of the received light in a direction sufficiently parallel to the axis of waveguide 501 to be captured and propagated in the waveguide to detector 123.

According to one example, as shown in for example FIG. 1, detector 123 can be connected to light pipes 107 and 111 through an optical fiber that would guide the received light to the detector. Alternatively or additionally, one or more sensors can be located at the end of light pipes 107 and 111 that can receive the light from light pipes 107 and 111 and can forward the received lights to detector 123. In another example, one or more detectors 123 can be coupled directly to light pipes 107 and 111 to receive and detect the light from the light pipes.

FIGS. 2A-2D are exemplary illustrations of different locations of a touch event on touch panel 101 and their effects on calculated attenuation factors, according to embodiments of this disclosure. FIGS. 2E and 2F are exemplary frequency transformed signals, according to embodiments of this disclosure.

Figure 2F:
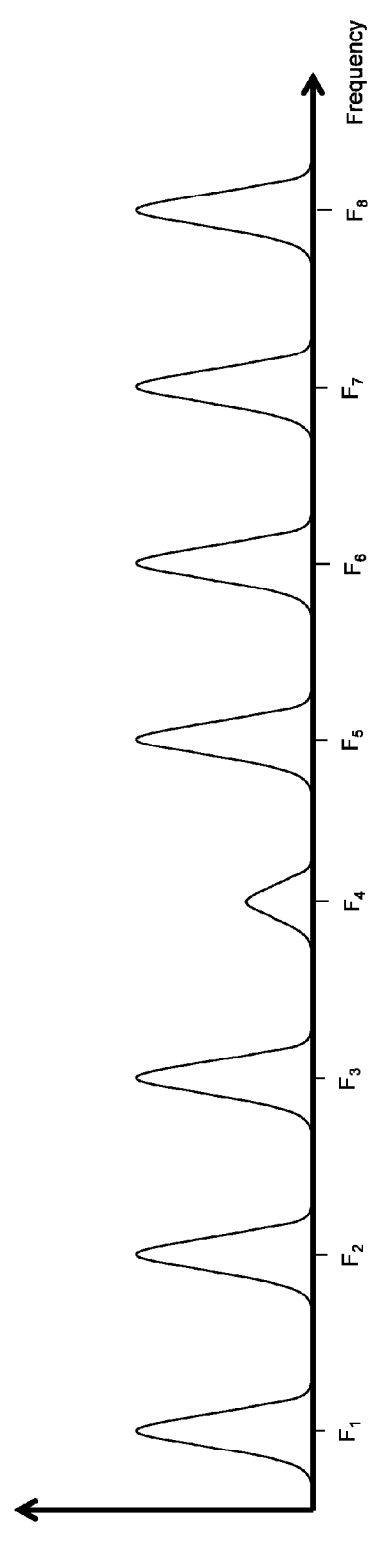

For example, FIG. 2A illustrates that a touch 201 occurs at location A. As illustrated in FIG. 2A, touch 201 significantly attenuates the light that is emitted from LED 103d (which its intensity is changing with a frequency of $F_4$). However, as shown in FIG. 2A, touch 201 does not affect light emitted from any other simultaneously excited LED 103. Accordingly, the frequency transform data generated by processor circuitry 117 from data received from detector 123 will have attenuation factors of, for example, $\alpha_4=0.6$ and $\alpha_k=0$ for $k\neq 4$. This attenuation is illustrated in FIGS. 2E and 2F. FIG. 2E shows an exemplary frequency transformed signal where there is no touch on touch pad 101. As shown in the example of FIG. 2E, frequencies $F_1$-$F_8$ have a same amplitude. FIG. 2F illustrates an exemplary frequency transformed signal for touch 201 at location A where the amplitude of the frequency transformed signal at frequency $F_4$ is attenuated 60% (the amplitude at frequency $F_4$ is 40% of the maximum amplitude).

The calculated attenuation factors are used by processing circuitry 117 to construct a profile for touch 201. Processing circuitry 117 can compare this constructed profile for touch 201 with saved profiles in, for example, memory 119 to determine the location of touch 201. For example, the X coordinate of touch 201 can be determined based on the fact that only attenuation factor for frequency $F_4$ is non-zero. The Y coordinate of touch 201 can further be determined based on the value of attenuation factor at $F_4$.

FIG. 2B illustrates a touch 203 that occurs at location B. As illustrated in FIG. 2B, touch 203 slightly attenuates the light that is emitted from LEDs 103b, 103c, 103d, 103e, and 103f (which have intensities that are changing with frequencies of $F_2$, $F_3$, $F_4$, $F_5$, and $F_6$, respectively). However, as shown in FIG. 2B, touch 203 does not affect light emitted from any simultaneously excited LEDs 103a, 103g, and 103h. Accordingly, the frequency transform data generated by processor circuitry 117 from data received from detector 123 will have attenuation factors of, for example, $\alpha_2=\alpha_3=\alpha_4=\alpha_5=\alpha_6=0.1$ and $\alpha_k=0$ for k=1, 7, and 8. The calculated attenuation factors are used by processing circuitry 117 to construct a profile for touch 203. Processing circuitry 117 can compare this constructed profile for touch 203 with saved profiles in, for example, memory 119 to determine the location of touch 203. For example, the X coordinate of touch 203 can be determined based on the fact that only attenuation factors for frequencies $F_2$, $F_3$, $F_4$, $F_5$, and $F_6$ are non-zero. The Y coordinate of touch 203 can further be determined based on the value of attenuation factors at frequencies $F_2$, $F_3$, $F_4$, $F_5$, and $F_6$.

FIG. 2C illustrates a touch 205 that occurs at location C. As illustrated in FIG. 2C, touch 205 moderately attenuates the light that is emitted from LEDs 103c, 103d, and 103e (which have intensities that are changing with frequencies of $F_3$, $F_4$, and $F_5$, respectively). However, as shown in FIG. 2C, touch 205 does not affect light emitted from any other simultaneously excited LEDs 103. Accordingly, the frequency transform data generated by processor circuitry 117 from data received from detector 123 will have attenuation factors of, for example, $\alpha_3=\alpha_4=\alpha_5=0.2$ and $\alpha_k=0$ for k=1, 2, 6-8. The calculated attenuation factors are used by processing circuitry 117 to construct a profile for touch 205. Processing circuitry 117 can compare this constructed profile for touch 205 with saved profiles in, for example, memory 119 to determine the location of touch 205. For example, the X coordinate of touch 205 can be determined based on the fact that only attenuation factors for frequencies $F_3$, $F_4$, and $F_5$ are non-zero. The Y coordinate of touch 205 can further be determined based on the value of attenuation factors at frequencies $F_3$, $F_4$, and $F_5$.

FIG. 2D illustrates a touch 207 that occurs at location C'. As illustrated in FIG. 2D, touch 207 moderately attenuates the light that is emitted from LEDs 103e, 103f, and 103g (which have intensities that are changing with frequencies of $F_5$, $F_6$, and $F_7$, respectively). However, as shown in FIG. 2D, touch 207 does not affect light emitted from any other simultaneously excited LEDs 103. Accordingly, the frequency transform data generated by processor circuitry 117 from data received from detector 123 will have attenuation factors of, for example, $\alpha_5=\alpha_6=\alpha_7=0.2$ and $\alpha_k=0$ for k=1-4 and 8. The calculated attenuation factors are used by processing circuitry 117 to construct a profile for touch 207. Processing circuitry 117 can compare this constructed profile for touch 207 with saved profiles in, for example, memory 119 to determine the location of touch 207. For example, the X coordinate of touch 207 can be determined based on the fact that only attenuation factors for frequencies $F_5$, $F_6$, and $F_7$ are non-zero. The Y coordinate of touch 207 can further be determined based on the value of attenuation factors at frequencies $F_5$, $F_6$, and $F_7$. Location C' of touch 207 has the same y-component as location C of touch 205, but different x-component. The amount of attenuations associated with touch 205 and 207 are similar, but the frequencies that are affected are different. The difference between the affected frequencies distinguishes between location C of touch 205 and location C' of touch 207.

According to this example, the X coordinate of the touch is reflected in the centroid of $\alpha_k$ vs. k. In other words, for touch 201 at location A, the attenuations are $\alpha_4=0.6$ and $\alpha_k=0$ for $k\neq 4$. For touch 203 at location B, the attenuations are $\alpha_2=\alpha_3=\alpha_4=\alpha_5=\alpha_6=0.1$ and $\alpha_k=0$ for k=1, 7, and 8. For touch 205 at location C, the attenuations are $\alpha_3=\alpha_4=\alpha_5=0.2$ and $\alpha_k=0$ for k=1, 2, 6-8. For all three touches 201, 203, and 205 at locations A, B, and C, which have same X coordinate, the centroid of $\alpha_k$ is at $\alpha_4$. For touch 207 at location C', which has a different X coordinate than locations A, B, and C, the attenuations are $\alpha_5=\alpha_6=\alpha_7=0.2$ and $\alpha_k=0$ for k=1-4 and 8 with a centroid of $\alpha_6$.

Also, the Y coordinate of the touch is reflected in the width of the non-zero portion of $\alpha_k$ vs. k. In other words, for touch 201 at location A, the attenuations are $\alpha_4=0.6$ and $\alpha_k=0$ for $k\neq 4$. For touch 203 at location B, the attenuations are $\alpha_2=\alpha_3=\alpha_4=\alpha_5=\alpha_6=0.1$ and $\alpha_k=0$ for k=1, 7, and 8. For touch 205 at location C, the attenuations are $\alpha_3=\alpha_4=\alpha_5=0.2$ and $\alpha_k=0$ for k=1, 2, 6-8. The Y coordinate of these touches is reflected in the width of their non-zero portion of $\alpha_k$. Touches 205 and 207 at locations C and C', respectively, have the same Y coordinate, which is reflected in the width of their non-zero portion of $\alpha_k$ (for location C: $\alpha_3=\alpha_4=\alpha_5=0.2$ and for location C': $\alpha_5=\alpha_6=\alpha_7=0.2$.)

FIGS. 2A-2D were discussed with respect to LEDs 103, which, for example, are located on top of touch panel 101 along the X axis. Similar analysis is applicable for LEDs 109 that are located along the Y axis and use light pipe 111. In one example, LEDs 103 can be used to determine the location of a touch on touch panel 101, where the X coordinate of the touch can be determined more accurately than the Y coordinate. In this example, LEDs 109 can be used to determine the location of the touch on touch panel 101, where the Y coordinate of the touch can be determined more accurately than the X coordinate. Processor circuitry 117 can use the measurements based on lights emitted form LEDs 103 and 109 to more precisely determine the location of the touch. In one example, LEDs 103 and 109 are on simultaneously and therefore, there is no need to turn them on sequentially, as it is done in some conventional systems.

In one example, when LEDs 103 are used to determine the X-Y coordinate of a touch, the LEDs that have been blocked are used to determine the X coordinate of the touch. In other words, after the processor circuitry 117 determines the attenuation factors for all the frequencies, the processor circuitry 117 uses the frequencies that have non-zero attenuations to determine the X coordinate of the touch. According to one example, processor circuitry 117 uses a look-up table (that can be stored in memory 119 and/or processor circuitry 117) to determine the X coordinate based on the frequencies that have non-zero attenuation factors. It is noted that other methods to correlate the X coordinate and attenuation factors can also be used. Processor circuitry 117 can further use the value of the attenuation factors to determine the Y coordinate of the touch by, for example, using another characteristic look up table (CLUT) (that can be stored in memory 119 and/or processor circuitry 117) that correlate the value of the attenuation factor with the Y coordinate. It is noted that other methods to correlate the Y coordinate and attenuation factors can also be used. Although discussed separately, it is noted the look up tables for X and Y coordinates can be combined in one table. In this example, the X coordinate determined using LEDs 103 can be more accurate than the Y coordinate.

Similar analysis can be used to determine X and Y coordinate of the touch using LEDs 109. Similar look up tables as discussed above can be used although other methods to correlate the X and Y coordinates and attenuation factors can also be used. In this example, the Y coordinate determined using LEDs 109 can be more accurate than the X coordinate.

The determined X coordinate and approximate Y coordinate from LEDs 103 and the determined Y coordinate and approximate X coordinate from LEDs 109 can not only help determining the location of a touch, but can also be used to more accurately determine locations of multiple touches and/or determine efficiency factor of a touch.

As discussed above, the determined X coordinate and approximate Y coordinate from LEDs 103 and the determined Y coordinate and approximate X coordinate from LEDs 109 can also be used to determine efficiency factor of a touch. For example, when a frustrated total internal reflection technique (FTIR) discussed above is used, the approximate X and Y coordinates can be used to determine the efficiency of the touch. In one example, the touch efficiency is affected by, for example, finger moisture, pressure, etc. These factors affect how much of the light is blocked by a touch on touch panel 101. The approximate X and Y coordinates can be used to determine this efficiency factor for the touch. In one example, the ratio of the actual attenuation determined based on LEDs 103 to the attenuation in the characteristic look up table (CLUT) for determined value of Y coordinate defines a first efficiency factor. Similarly, the ratio of the actual attenuation determined based on LEDs 109 to the attenuation in the characteristic look up table (CLUT) for determined value of X coordinate defines a second efficiency factor. The system detects X and Y coordinates for each touch independently, so when there is more than one touch, the system yields a set of X and Y coordinates that have to be paired up to yield an "ordered" pair that defines a specific touch location. For a given "accurate" X measurement, there is an associated "approximate" Y location, as well as an associated touch efficiency. The "approximate" Y location can be used to identify the correct matching accurate Y coordinate. Further, the choice can be validated by matching up the touch efficiencies of the two measurements. This approach to X-Y "ordered pairing" effectively solves the otherwise monumental task of matching the correct X (taken one at a time) with the correct Y (from a choice of N—given that there are N touches). The pairing may also be performed in the reverse order; for a given accurate Y, the matching accurate X may be identified based upon matching touch efficiency coupled with nearest proximity of the set of accurate available X's. So, for example, when there are five unique touch events, the embodiments of this disclosure are able to correctly yield the sets of X and Y coordinates (out of twenty five possible (X,Y) pairing) that have to be paired up to yield the "ordered" pairs that define the five specific touch locations.

For example, when there are multiple touches on touch panel 101, the "accurate" and "approximate" X and Y coordinates for each touch can be determined as discussed above. Further, efficiency factors for each touch can also be determined based on the "accurate" and "approximate" X and Y coordinates, as discussed above. The efficiency factors can be used to determine whether any of the determined touches are phantom or spurious points and therefore, are not the result of a touch event. In other words, if a first determined efficiency factor has a much higher value than a second efficiency factor, it can be determined that the event associated with the second efficiency factor was a phantom event.

Although the embodiments of this disclosure are discussed with respect to X-Y coordinates, it is noted that other coordinate systems may be used, such as, but not limited to, polar coordinates with a radius and angle about the origin.

Also, it is noted that although one detector 123 and one touchscreen controller 113 are shown in FIG. 1, system 100 can include other number of detectors and touchscreen controllers. For example, in one embodiment, system 100 can include two detectors, one configured to receive the light from light pipe 107 and another one configured to receive light from light pipe 111. Additionally or alternatively, each detector can be coupled to a respective A/D converter to convert its detector's analog data to digital data. One or more processor circuitry (in combination with one or more memories) can be used to analyze the digital data to determine the location of a touch.

FIG. 3A illustrates a frequency multiplexed touch panel system 300, according to another embodiment of the disclosure. System 300 includes two sets of LEDs 301 and 303. Each set of LEDs 301 and 303 are shown to include eight LEDs. But, it is noted that this disclosure is not limited to two sets of LEDs, and any number of blocks of any number of LEDs can be used. In other words, system 300 can include N blocks of M LEDs. Also, although the LEDs are shown to be located along the X axis, system 300 can include LEDs located along the Y axis, similar to system 100 of FIG. 1.

Optical receiver (such as, but not limited to, light pipe) 307 is similar to optical receiver 107 of system 100 of FIG. 1. Further, although not shown, system 300 includes detector(s) and touchscreen controller(s) (including, for example, A/D converter, processor circuitry, and memory) similar to detector(s) 123 and touchscreen controller(s) 115 of FIG. 1.

According to one example, all the LEDs 301 and 303 can be substantially simultaneously excited where the intensity of each LED is changed with a unique frequency. In other words, unique frequencies are used for each LED of the sets 301 and 303 to change the intensity of their light and all the LEDs are excited simultaneously.

Additionally or alternatively, the LEDs in LED set 301 are first excited substantially simultaneously using eight different frequencies and then later the LEDs in LED set 303 are similarly excited. In other words, LEDs in set 301 are substantially simultaneously excited and LEDs in set 303 are also substantially simultaneously excited, however, sets 301 and 303 are exited sequentially. In this example, the corresponding LEDs of each set of LEDs 301 and 303 can have the same frequency. In other words, the intensity of the light emitted from the first LED of set 301 changes with the same frequency (e.g., $F_1$) as the intensity of the light emitted from the first LED of set 303 changes. The intensity of the light emitted from the second LED of set 301 changes with the same frequency (e.g., $F_2$) as the intensity of the light emitted from the second LED of set 303 changes, and so on. In this example, a same eight frequencies can be used for both set of LEDs 301 and 303 and therefore, with such sequential excitation of two blocks of eight LEDs, eight frequencies are needed. Therefore, an N sequentially excited blocks of M LEDs can support a total of N×M LEDs with M frequencies.

According to another example, instead of sequentially excited, two or more sets of LEDs can be excited substantially simultaneously. In this example, still the corresponding LEDs of each set of LEDs can have the same frequency. In other word, the intensity of the light emitted from the first LED of set 301 changes with the same frequency (e.g., $F_1$) as the intensity of the light emitted from the first LED of set 303 changes. The intensity of the light emitted from the second LED of set 301 changes with the same frequency (e.g., $F_2$) as the intensity of the light emitted from the second LED of set 303 changes, and so on. However, if both, for example, LED 301d of set 301 and LED 303d of set 303, which have the same frequency of e.g., $F_4$, are excited simultaneously (rather than sequentially) but one of them is blocked by a touch, an ambiguity in X-coordinate detection can occur, since the touchscreen controller might not be able to determine which one of LEDs 301d and 303d is being blocked. One approach to solve this ambiguity is to excite the blocks/sets of LED sequentially, as discussed above. Another approach can be to use a unique frequency for each LED, as discussed above.

According to another exemplary embodiment, LED set 303 can use the same frequencies used for LED set 301, however, the frequencies for LED set 303 are scrambled. In this example, two or more sets of LEDs (for example, sets 301 and 303 in FIG. 3A) are excited simultaneously. For example, LEDs 301a, 301b, 301c, 301d, 301e, 301f, 301g, and 301h of set 301 can have frequencies $F_1$, $F_2$, $F_3$, $F_4$, $F_5$, $F_6$, $F_7$, and $F_8$. Then, LEDs 303a, 303b, 303c, 303d, 303e, 303f, 303g, and 303h of set 303 can have frequencies $F_5$, $F_7$, $F_2$, $F_4$, $F_6$, $F_8$, $F_1$, and $F_3$ (same frequencies as set 301, but scrambled). In other words, the intensity of light emitted from each of the radiation sources in sets 301 and 303 is modulated with a modulation frequency from a set of frequencies utilized repetitively in varying order between sets 301 and 303. Therefore, if a touch is located at location 305, touchscreen controller 113 can determine the X coordinate of the touch since the attenuations will be measured at frequencies $F_3$, $F_4$, $F_5$ of LEDs 301c, 301d, 301e. This is in comparison to touch at location 309 where the detected attenuations correspond to frequencies $F_2$, $F_4$, $F_6$ that correspond to LEDs 303c, 303d, 303e. In one example, for each LED with the same frequency in two sets of LEDs, their neighbors will have different frequencies in the two sets of LEDs. In the example of FIG. 3A, when processing circuitry 117 detects that light intensity for frequencies $F_3$, $F_4$, $F_5$ have been attenuated intensities, it can determine that the touch should have been in the section of touch panel 101 under LED set 301, because only LED set 301 has frequencies $F_3$, $F_4$, $F_5$ in that order. If processing circuitry 117 detects that light intensity for frequencies $F_2$, $F_4$, $F_6$ have been attenuated intensities, it can determine that the touch should have been in the section of touch panel 101 under LED set 303, because only LED set 303 has frequencies $F_3$, $F_4$, $F_5$ in that order. Therefore, both sets of LEDs 301 and 303 can be simultaneously excited without ambiguity in determining the location of a touch.

In one example, scrambling the frequencies from LED set 301 to LED set 303 can include choosing a first frequency from the set of frequencies $F_1$, $F_2$, $F_3$, $F_4$, $F_5$, $F_6$, $F_7$, and $F_8$ for LED 303a, then, randomly choosing a second frequency from the remaining frequencies for LED 303b, and continuing with this scheme until all LEDs 303 are given a frequency. The method further can include comparing the frequencies of LEDs 303 to frequencies of LED 301 to check they are uniquely ordered. If not, the method can start again. This method can be used to determine different ordered sets of frequencies based on frequencies $F_1$, $F_2$, $F_3$, $F_4$, $F_5$, $F_6$, $F_7$, and $F_8$. Although one method for scrambling frequencies for different sets of LEDs is discussed, it is noted that other methods are applicable to construct different sets of frequencies based on a given number of frequencies, such that different blocks of LEDs can be simultaneously excited without ambiguity in determining the location of a touch.

FIG. 3B illustrates another example for scrambling frequencies for blocks of LEDs, according to one embodiment of the disclosure. Example of FIG. 3B illustrates a table for four groups of LEDs each including 32 LEDs. Column 323 illustrates the frequencies used for each LED in the first group of LEDs. Column 325 illustrate frequencies used for each LED in the second group. Column 327 illustrates the frequencies used for each LED in the third group of LEDs, and column 329 illustrates the frequencies used for each LED in the fourth group of LEDs. A same 32 frequencies are used in each group, but their assignment to the LEDs are different in each group than the other groups.

Figure 4A:
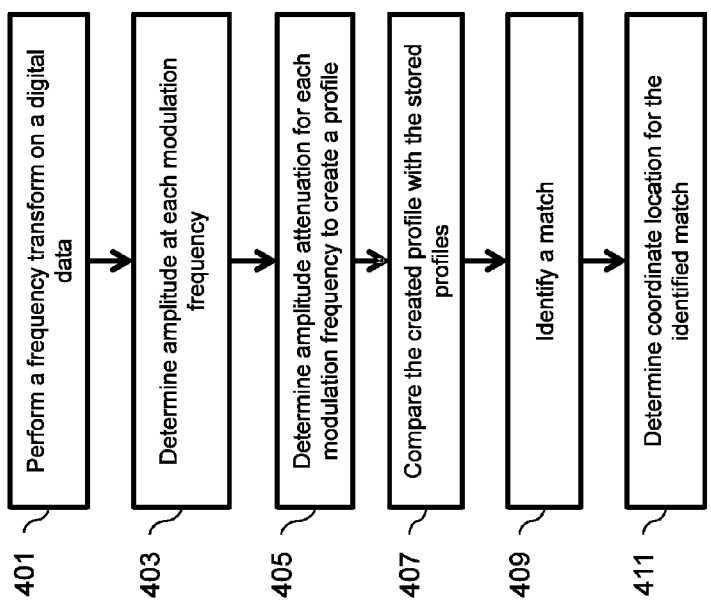
FIGS. 4A and 4B illustrate flow charts of methods, according to an embodiment of the disclosure.

FIG. 4A illustrates a flow chart of method 400 performed by the system 100 shown in FIG. 1 and/or system 300 shown in FIG. 3A, in accordance with an embodiment of the present disclosure. It is to be appreciated not all steps may be needed to perform the disclosure provided herein. Further, some of the steps may be performed simultaneously, or in a different order than that shown in FIG. 4A, as will be understood by those skilled in the art.

In step 401, processing circuitry 117 performs a frequency transform (such as, but not limited to FFT) on a digital data. Additionally or alternatively, touchscreen controller 113 can include separate circuitry to perform the frequency transform. Processing circuitry 117 can receive the digital data/signal from A/D converter 115. The A/D converter 115 receives an analog signal from detector 123, the analog signal being in response to the light received by detector 123. Processing circuitry 117 is configured to use the digital data to determine whether touch panel 101 has been touched and if so, to determine the location of the touch event on touch panel 101.

In step 403, amplitude of, for example, the frequency transformed signal for each modulation frequency is determined. The determined amplitude for each modulation frequency is associated with the amount of reduction in received radiation beams from the radiation source(s) associated with that modulation frequency because of a possible touch event blocking those radiation beams.

In step 405, the amplitude attenuation for each frequency can be calculated to create a profile for the received digital signal. In one example, the value of the maximum amplitude can be stored in memory 119, and step 405 can include a comparison between the determined amplitude and the maximum amplitude for each modulation frequency. If no attenuation is determined in step 405, it can be concluded that touch panel 101 was not touched, and the method can start from the beginning.

However, if the value of the determined attenuation for one or more modulation frequency is other than zero, then in step 407, the created profile can be compared to stored profiles (e.g., template profiles). According to one example, the stored profiles are stored in memory 119. In step 409, a match between the stored profiles and the created profile can be identified. In step 411, the coordinates of the location for the touch can be determined based on the identified match.

In one example, identifying the match between the created profile and the stored profiles in step 409 can be based on determining a score for each comparison in step 407. The score can represent how different or how closely the created profile is matched to the stored profiles. In one example, the identified match in step 409 is the comparison that had the best score, where the created profile and stored profile had the highest degree of correlation. In one embodiment, the determined attenuations for each modulation frequency are compared to the stored attenuations for the same frequencies, and a match is identified when each of the determined attenuations is within a threshold of its corresponding stored attenuations. Additionally or alternatively, a match can be identified if a first set of determined attenuations are within a first threshold of their corresponding stored attenuations and a second set of determined attenuations are within a second threshold of their corresponding attenuations. In another example, the determined score for each comparison in step 407 can include determining an error (such as but not limited to, mean squared error, etc.) between the determined attenuations and their corresponding stored attenuations, and comparing the determined error to a threshold.

According to one example, the stored profiles (e.g., template profiles) can be generated before touch panel 101 and touchscreen 113 are used to determine locations of touches on touch panel 101. In one example, the total area of touch panel 101 can be scanned by touch events, and the attenuations for each modulation frequency at each location of the touch can be calculated. A profile and its corresponding coordinates can be stored, for example, in memory 119. The stored profiles and their corresponding coordinates can be used later for location detection.

Figure 4B:
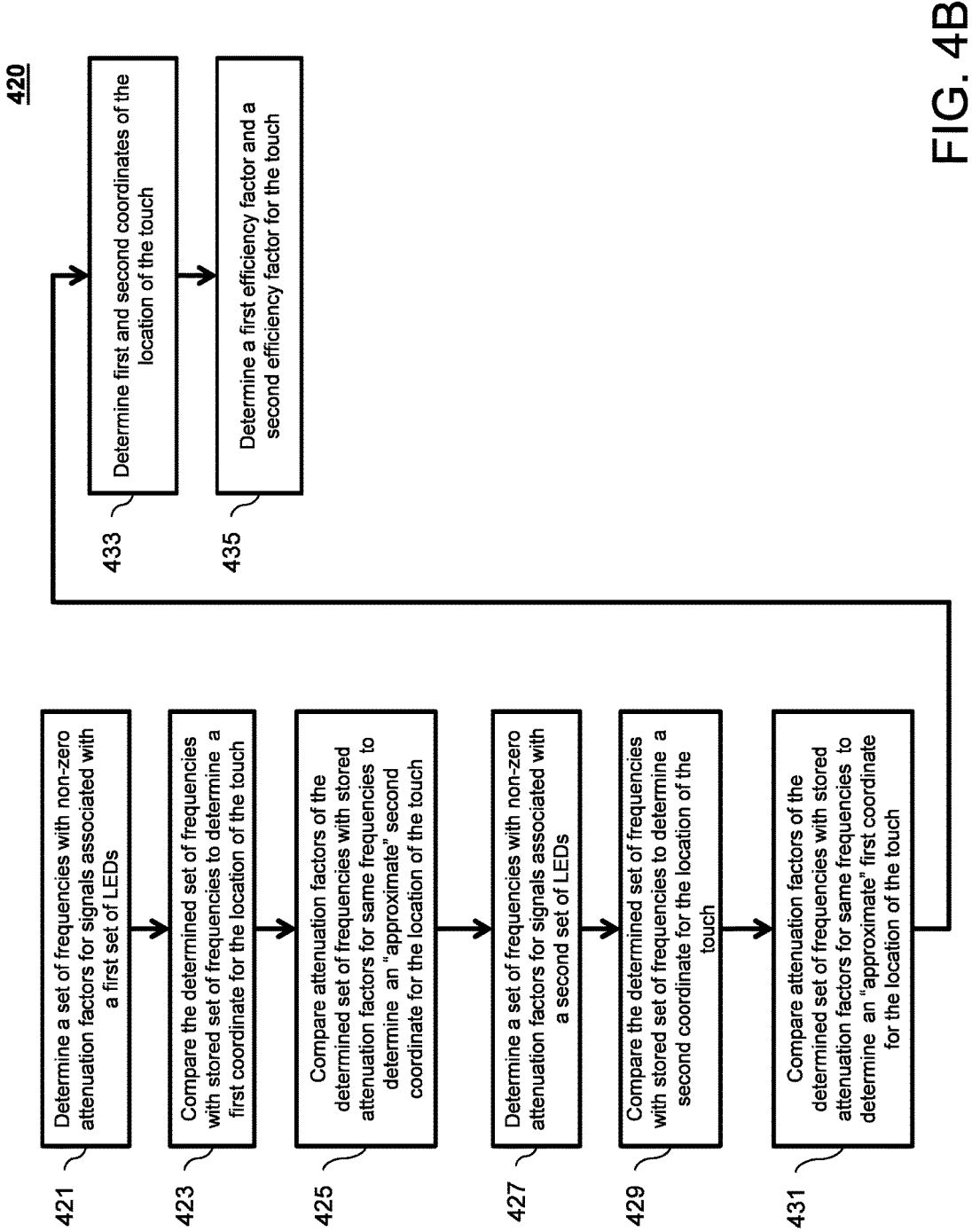

FIG. 4B illustrates a flow chart of method 420 performed by the system 100 shown in FIG. 1 and/or system 300 in FIG. 3A, in accordance with an embodiment of the present disclosure. It is to be appreciated not all steps may be needed to perform the disclosure provided herein. Further, some of the steps may be performed simultaneously, or in a different order than that shown in FIG. 4B, as will be understood by those skilled in the art. In one example, method 420 can be performed as part of steps 407-411 of FIG. 4A.

In step 421, a set of frequencies with non-zero attenuation factors for signals associated with a first set of LEDs are determined. For example, when LEDs 103 are used to determine the X-Y coordinate of a touch, after the processor circuitry 117 determines the attenuation factors for all the frequencies, the processor circuitry 117 uses the frequencies that have non-zero attenuation factors to determine the X coordinate of the touch. In step 421, first the set of frequencies with non-zero attenuation factors are determined.

In step 423, the determined set of frequencies is compared to a stored set of frequencies to determine a first coordinate, such as the X coordinate, of the location of the touch. According to one example, processor circuitry 117 can use a look-up table (that can be stored in memory 119 and/or processor circuitry 117) to determine the X coordinate based on the frequencies that have non-zero attenuation factors.

In step 425, the values of the attenuation factors of the determined set of frequencies are compared with stored attenuation factors for the same frequencies to determine an "approximate" second coordinate, such as an "approximate" Y coordinate. For example, processor circuitry 117 can use the value of the attenuation factors to determine the Y coordinate of the touch by, for example, using another characteristic look up table (CLUT) (that can be stored in memory 119 and/or processor circuitry 117) that correlates the value of the attenuation factor with the Y coordinate. In this example, the X coordinate determined using LEDs 103 can be more accurate than the Y coordinate.

Steps 427-431 are similar to steps 421-425 performed for signals associated with, for example, LEDs 109. In this example, the Y coordinate determined using LEDs 109 can be more accurate than the X coordinate. It is noted that although steps 421-425 are shown before steps 427-431, these steps can be performed in any other order. For example, they can be performed in parallel using one or more touchscreen controllers 113.

In step 433, the determined X coordinate and approximate Y coordinate from LEDs 103 and the determined Y coordinate and approximate X coordinate from LEDs 109 can be used to determine the X and Y coordinate of the location of the touch.

In step 435, first and second efficiency factors can also be determined for the touch, for example, when a frustrated total internal reflection technique (FTIR) discussed above is used. In one example, the touch efficiency is affected by, for example, finger moisture, pressure, etc. These factors affect how much of the light is blocked by a touch on touch panel 101. The approximate X and Y coordinates can be used to determine these efficiency factors. In one example, the ratio of the actual attenuation determined based on LEDs 103 to the attenuation in the characteristic look up table (CLUT) for determined value of Y coordinate defines a first efficiency factor. Similarly, the ratio of the actual attenuation determined based on LEDs 109 to the attenuation in the characteristic look up table (CLUT) for determined value of X coordinate defines a second efficiency factor. These efficiency factors correlate with each other in terms of touch efficiency and can be used to eliminate ghost touches and pair X and Y coordinate in multi-touch cases.

Figure 6:
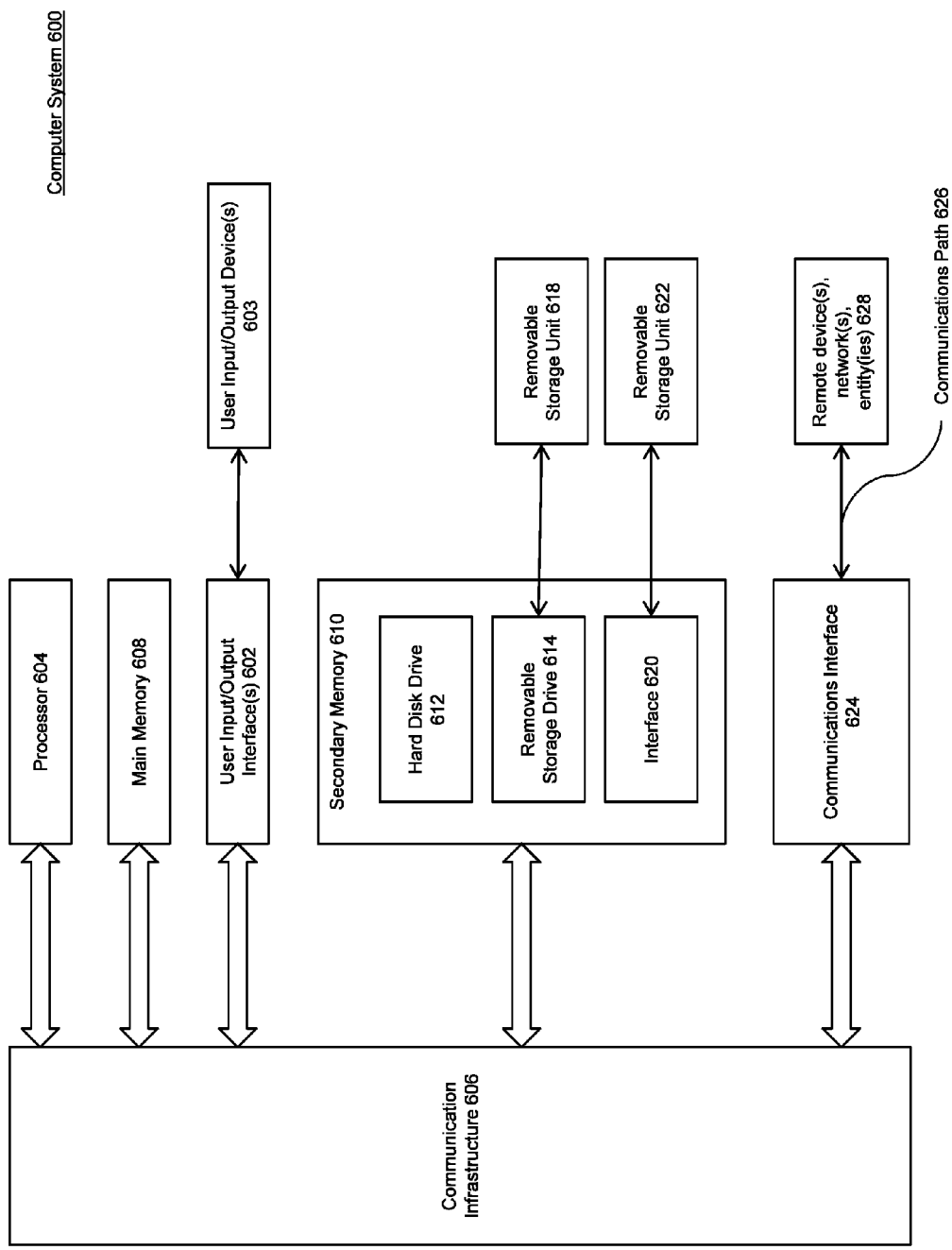
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein. Computer system 600 may be internal or external to system 100 as discussed above.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 414 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A touch system, comprising:
   a touch panel;
   a first plurality of radiation sources located at a first edge of the touch panel;
   a second plurality of radiation sources located at the first edge of the touch panel,
   wherein an intensity of light emitted from each of the first and second plurality of radiation sources is modulated with a modulation frequency from a set of frequencies utilized repetitively in varying order between the first and the second plurality of radiation sources; and an optical receiver located at a second edge of the touch panel and configured to receive the light emitted from each of the first and second plurality of radiation sources.

2. The touch system of claim 1, wherein the modulation frequencies of the second plurality of radiation sources are uniquely ordered with respect to the first plurality of radiation sources.

3. The touch system of claim 2, wherein when a first radiation source in the first plurality of radiation sources has a same modulation frequency as a second radiation source in the second plurality of radiation sources, a neighboring radiation source of the second radiation source does not have a same modulation frequency as a corresponding neighboring radiation source of the first radiation source.

4. The touch system of claim 1, wherein the first plurality of radiation sources and the second plurality of radiation sources are substantially simultaneously excited to emit the light.

5. The touch system of claim 1, further comprising:
a detector configured to receive the light emitted from each of the first and second plurality of radiation sources and directed by the optical receiver, wherein the detector is configured to generate an analog signal based on the received light.

6. The touch system of claim 5, further comprising:
an analog to digital (A/D) converter configured to receive the analog signal and convert it to a digital signal; and
a processor circuitry configured to receive the digital signal and determine coordinates of a touch event on the touch panel.

7. The touch system of claim 6, wherein the processor circuitry includes one of an audio digital signal processing (DSP) and a video DSP.

8. The touch system of claim 6, wherein the processor circuitry is configured to:
perform a frequency transform on the digital signal and determine an amplitude of the frequency transformed signal for each of the respective modulation frequencies;
determine an attenuation factor for each of the respective modulation frequencies; and
determine coordinates of the touch event on the touch panel based on the determined attenuation factor.

9. The touch system of claim 8, wherein the frequency transform comprises a Fast Fourier Transform (FFT).

10. The touch system of claim 1, further comprising:
a third plurality of radiation sources located at a third edge of the touch panel, wherein an intensity of light emitted from each of the third plurality of radiation sources is modulated with a respective modulation frequency and wherein the third edge of the touch panel is orthogonal to the first edge of the touch panel.

11. The touch system of claim 10, further comprising:
a second optical receiver located at a fourth edge of the touch panel and configured to receive the light emitted from each of the third plurality of radiation sources, wherein the fourth edge of the touch panel is orthogonal to the first edge of the touch panel.

12. The touch system of claim 11, further comprising a processor circuitry configured to:
determine a first set of coordinates of a touch event on the touch panel based on the light emitted from each of the first and second plurality of radiation sources;

determine a second set of coordinates of the touch event based on the light emitted from each of the third plurality of radiation sources; and
determine an efficiency factor of the touch event based on the determined first and second set of coordinates.

13. The touch system of claim 1, wherein the plurality of radiation sources comprise a plurality of light emitting diodes (LEDs).

14. The touch system of claim 1, wherein the modulation frequencies are between about 200 Hz and 20 kHz.

15. A touch system, comprising:
a touch panel;
a first plurality of light emitting diodes (LEDs) located at a first edge of the touch panel;
a second plurality of LEDs located at the first edge of the touch panel,
wherein an intensity of light emitted from each of the first and second plurality of LEDs is modulated with a modulation frequency from a set of frequencies utilized repetitively in varying order between the first and the second plurality of LEDs;
a first optical receiver located at a second edge of the touch panel and configured to receive the light emitted from each of the first and second plurality of LEDs;
a third plurality of LEDs located at a third edge of the touch panel, wherein an intensity of light emitted from each of the third plurality of LEDs is modulated with a respective modulation frequency and wherein the third edge of the touch panel is orthogonal to the first edge of the touch panel;
a second optical receiver located at a fourth edge of the touch panel and configured to receive the light emitted from each of the third plurality of LEDs; and
a processor circuitry configured to detect a touch event on the touch panel based on the light received from the first, second, and third plurality of LEDs.

16. A method, comprising:
receiving radiation beams from a first plurality of radiation sources and a second plurality of radiation sources located at a first edge of a touch panel,
wherein an intensity of the radiation beam emitted from each of the first and second plurality of radiation sources is modulated with a modulation frequency from a set of frequencies utilized repetitively in varying order between the first and the second plurality of radiation sources;
generating a digital signal based on the received radiation beams;
performing a frequency transform on the digital signal and determining an amplitude of the frequency transformed signal for each of the respective modulation frequencies; and
determining coordinates of a touch event on the touch panel based on the determined amplitudes.

17. The method of claim 16, further comprising:
determining an attenuation factor for each of the respective modulation frequencies.

18. The method of claim 17, wherein the determining coordinates of a touch event comprises determining the coordinates of the touch event based on the determined attenuation factors.

19. The method of claim 18, wherein the determining coordinates of a touch event comprises:
determining a set of the modulation frequencies for which the determined attenuation factor is not zero;
comparing the determined set of the modulation frequencies with stored sets of frequencies; and determining a first coordinate of the touch event based on the comparison.

20. The method of claim 19, wherein the determining coordinates of a touch event further comprises:

comparing the attenuation factors of the determined set of the modulation frequencies with stored attenuation factors for the determined set of the modulation frequencies to determine a second coordinate of the touch event.

\* \* \* \* \*